C. E. MARSH.
SUPPORT FOR GAGE ROLLS.
APPLICATION FILED JUNE 19, 1908.
936,647.
Patented Oct. 12, 1909.
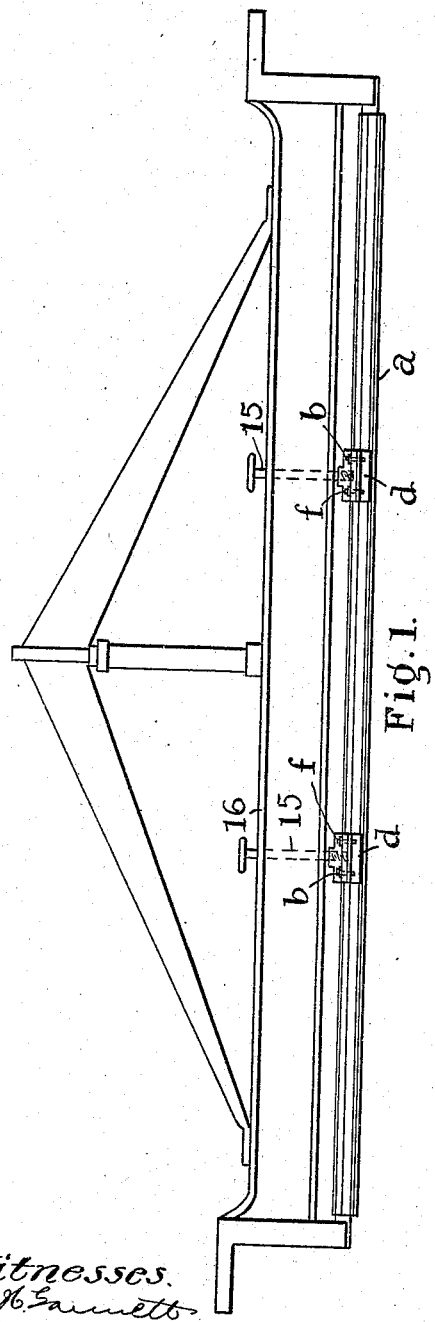
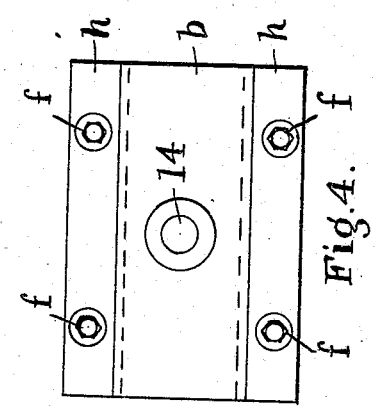
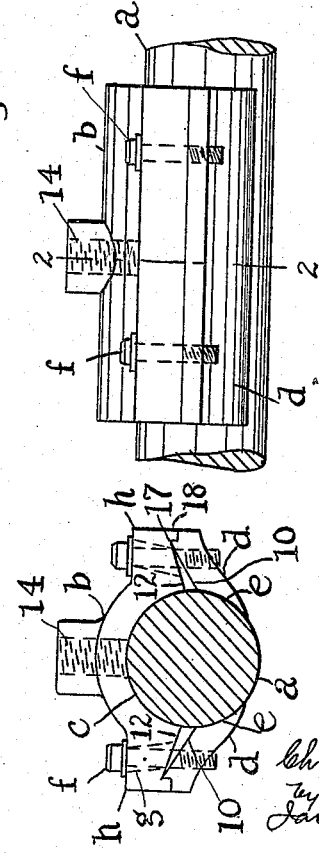
Witnesses.
C. H. Garnett
J. Murphy.
Inventor.
Charles Edwin Marsh
by Jas. H. Churchill
atty.

UNITED STATES PATENT OFFICE.

CHARLES EDWIN MARSH, OF NEWARK, NEW JERSEY, ASSIGNOR TO JOHN A. METZLER, OF NEWARK, NEW JERSEY.

SUPPORT FOR GAGE-ROLLS.

936,647.      Specification of Letters Patent.      Patented Oct. 12, 1909.

Application filed June 19, 1908. Serial No. 439,367.

*To all whom it may concern:*

Be it known that I, CHARLES EDWIN MARSH, a citizen of the United States, residing in Newark, county of Essex, and State of New Jersey, have invented an Improvement in Supports for Gage-Rolls, of which the following description, in connection with the accompanying drawings, is a specification, like characters on the drawings representing like parts.

This invention relates to a saddle or support for rolls and is especially adapted for use in belt knife splitting machines, as a support for the gage roll.

The invention has for its object to provide a saddle or support, which is capable of being adjusted to fit the roll and compensate for wear, and thereby maintain the same perfectly true and in the best possible working condition. For this purpose the saddle is composed of a stationary upper member, which is curved on its underside to fit the upper portion of the gage roll, and of two side members or jaws, which are curved on their inner surfaces to conform to the curve of the roll and which are adjustably secured to the sides of the stationary upper member, so that as the roll is worn, said side members or jaws may be moved up and in toward the stationary member and engage the roll so as to firmly support it for the greater portion of the circumference of the roll. The side members or jaws are capable of being adjusted while the roll is in operation. The side members or jaws of the saddle or support are removable from the stationary member, so as to permit of the removal of the gage roll without disturbing the stationary member. These and other features of this invention will be pointed out in the claims at the end of this specification.

Figure 1 is a side elevation of a saddle or support for the gage roll of a belt knife splitting machine. Fig. 2, a cross section on an enlarged scale, taken on the line 2—2, Fig. 3. Fig. 3, a side elevation on an enlarged scale of the saddle and a portion of the gage roll, and Fig. 4, a plan view of the saddle shown in Fig. 1.

Referring to the drawings, $a$ represents the gage roll of a belt knife splitting machine, with which coöperates a saddle or support comprising a plurality of supporting members, each consisting of a stationary upper member $b$ provided with a concavity $c$ on its under side, which is of the same curvature as the gage roll $a$. The concavity $c$ is made to embrace or fit substantially one half of the circumference of the gage roll so as to form a firm bearing for the upper part or half of said roll, yet permit the latter to be readily removed from the same.

The upper member $b$ has adjustably secured to it two holding side members or jaws $d$, which are provided with curved inner surfaces $e$ of the same curvature as the gage roll, so as to form bearings for the lower portion of the said roll. The side members or jaws engage the gage roll on the opposite sides of the vertical center of the same, so as to leave the uppermost part of the gage roll uncovered to engage the leather.

The inner ends of the holding jaws $d$ are adjustable toward and from the stationary member of the saddle or support, which may be accomplished by screws $f$ extended through holes $g$ in the side flanges $h$ of the upper member and engage threaded sockets or holes in the said jaws. The upper surfaces 10 of the holding jaws are inclined upward and bear against the under surface of the side flanges $h$ near the outer ends of said jaws, so as to leave a space 12 between the inner ends of the jaws and the under surface of the side flanges $h$ near the concavity $c$, so that by turning the adjusting screws $f$, the holding jaws may be turned upward with the points of contact of the jaws with the side flanges as a center, thereby maintaining the curved inner surfaces of said jaws in engagement with the gage roll and thus compensating for wear of the same.

The upper member $b$ of the saddle is provided as shown with a threaded socket 14 for the reception of a screw 15, which is extended down through the cross beam 16 commonly employed in leather splitting machines to support the journal boxes for the ends of the gage roll.

In practice the supporting devices or saddles may be distributed at predetermined points throughout the length of the gage roll after the manner represented in Fig. 1. If desired, the upper surface of the jaws $d$ may be provided with a projection 17 to engage a depending lip 18 on the under side of the flanges $h$ of the upper member, but I do not desire to limit my invention in this respect.

By reference to Figs. 2 and 3, it will be seen that by removing the jaws $d$ from the stationary member $b$, the gage roll is left free to be readily removed from engagement with the upper member and from the machine, without pulling down or seriously dismantling the latter. It will also be observed that the jaws $d$ may be adjusted by means of the screws $f$ while the machine is in operation.

Claims.

1. In a machine of the class described, in combination, a gage roll, a saddle or support therefor comprising an upper member having a concavity on its under surface to conform with the upper portion of the gage roll and provided with side flanges, holding jaws having curved inner surfaces to engage the lower part of the gage roll, and screws extended down through the side flanges of the upper member and engaging the said holding jaws, substantially as described.

2. A saddle or support for rolls comprising an upper member having a concavity in its under surface to conform to the roll to be supported and provided with side flanges, downwardly inclined jaws having curved inner surfaces to conform to the circumference of the said roll, and having their upper outer ends engaging said side flanges, and adjusting screws extended through said side flanges and engaging said jaws, substantially as described.

3. A saddle or support for rolls comprising an upper member having a concavity in its under surface to conform to the roll to be supported and provided with side flanges, and holding jaws adjustably secured to said side flanges and provided with curved inner surfaces to engage the lower portion of the roll, and means to secure said jaws in their adjusted positions, substantially as described.

4. A saddle or support for rolls comprising an upper member having a concavity in its under surface to conform to the roll to be supported, holding jaws having curved inner surfaces to conform to said roll, and means for securing said jaws to said upper member, substantially as described.

5. A saddle or support for rolls comprising an upper member having a concavity in its under surface to conform to the roll to be supported, holding jaws to engage the under surface of the roll and capable of having their inner ends moved toward said upper member, and means to secure said holding jaws to the said upper member.

In testimony whereof, I have signed my name to this specification in the presence of two subscribing witnesses.

CHARLES EDWIN MARSH.

Witnesses:
LULU WOERNER,
WM. WOERNER.